UNITED STATES PATENT OFFICE.

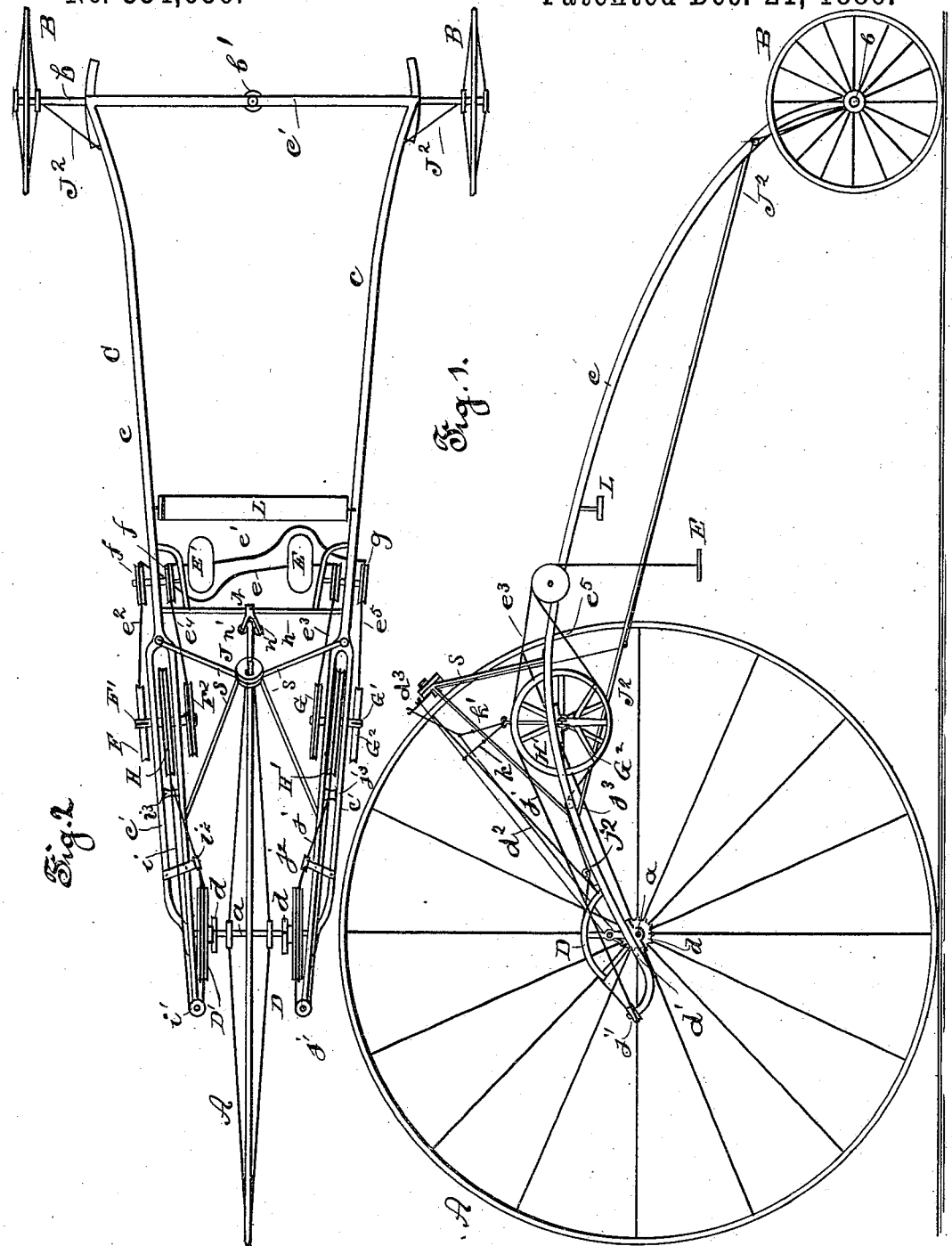

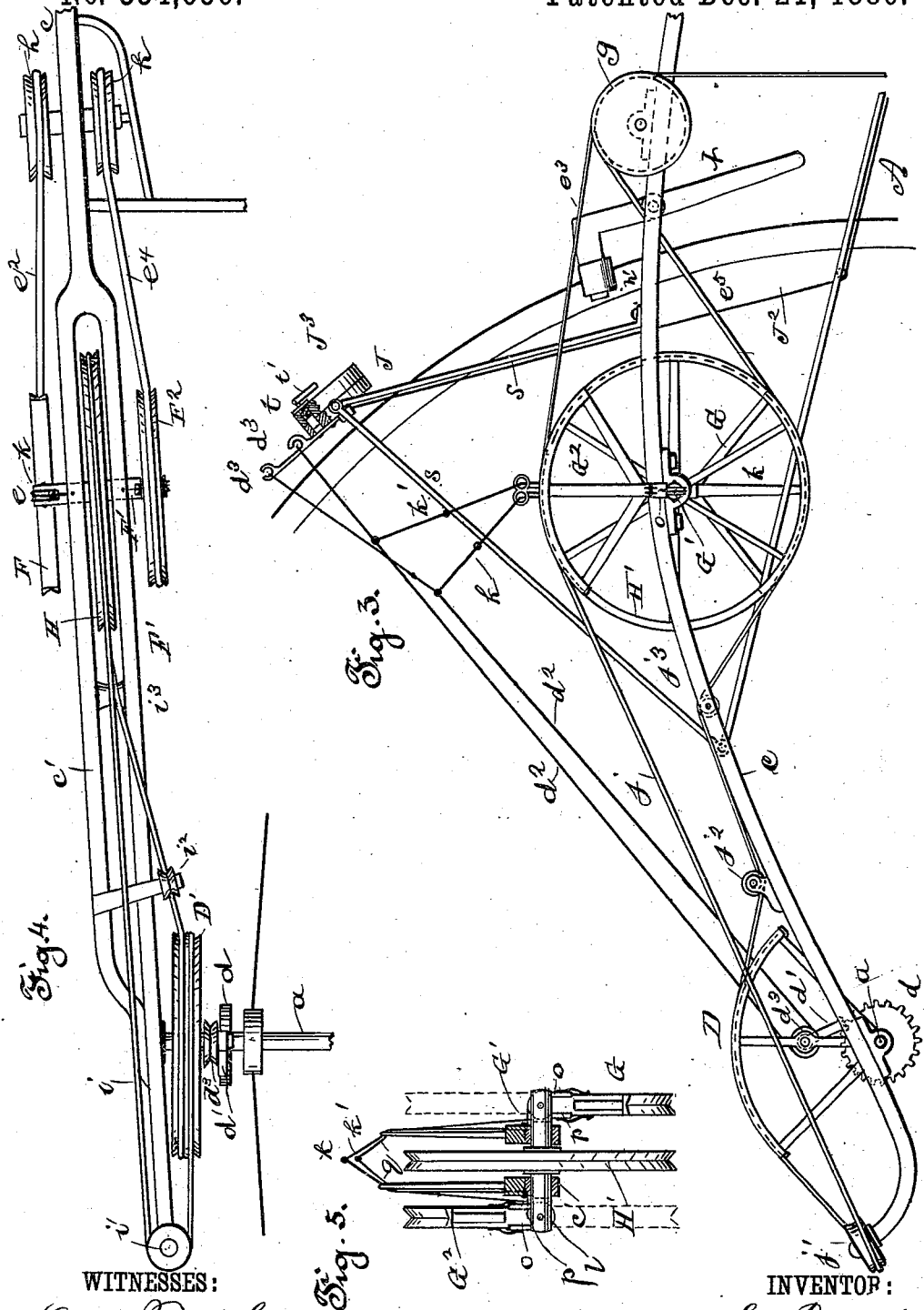

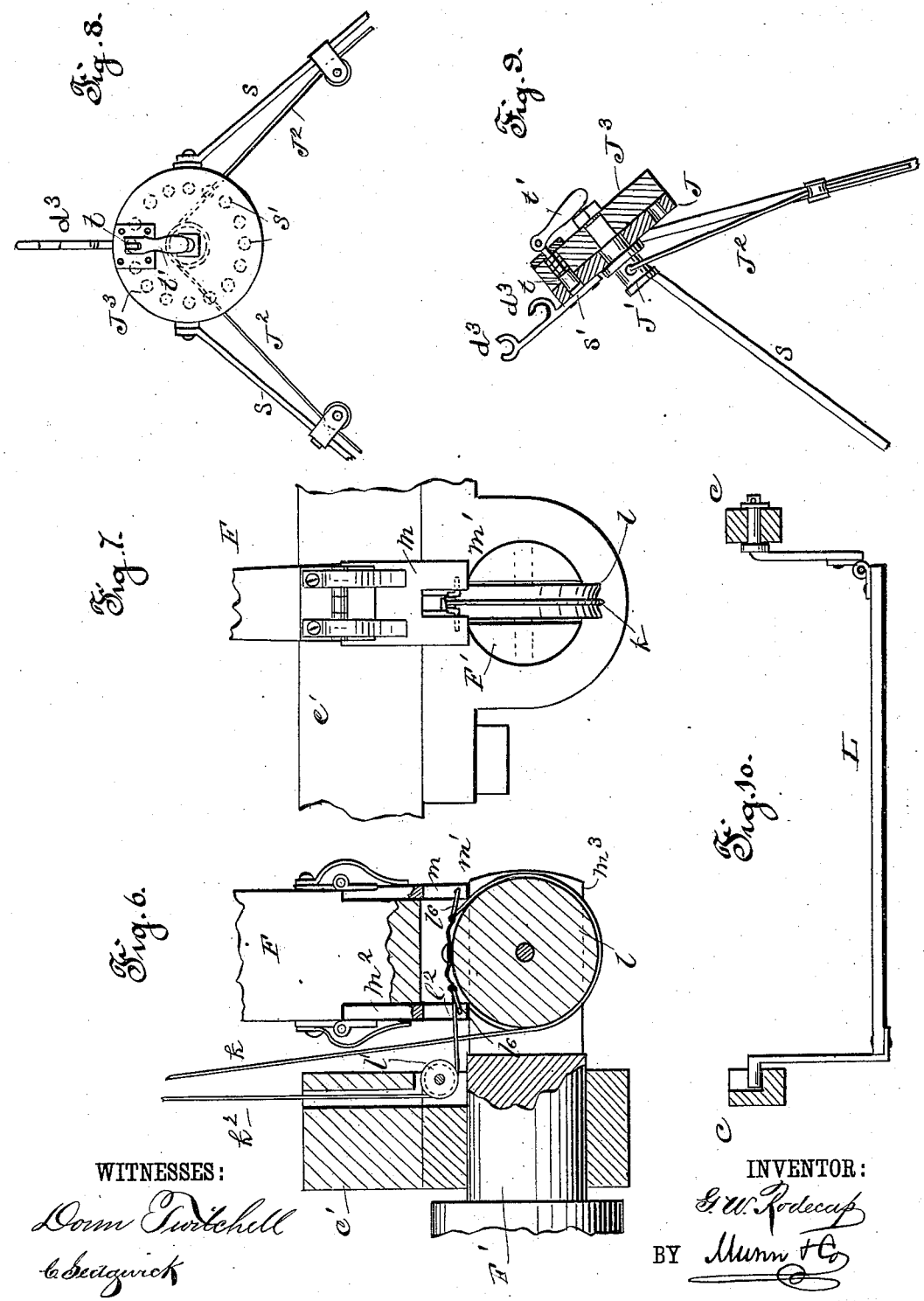

GEORGE W. RODECAP, OF MIDDLETOWN, INDIANA.

VELOCIPEDE.

SPECIFICATION forming part of Letters Patent No. 354,656, dated December 21, 1886.

Application filed August 30, 1886. Serial No. 212,243. (No model.)

*To all whom it may concern:*

Be it known that I, GEORGE W. RODECAP, of Middletown, in the county of Henry and State of Indiana, have invented a new and Improved Tricycle, of which the following is a full, clear, and exact description.

My invention relates to tricycles or foot or hand power vehicles; and the invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a side elevation of my new tricycle. Fig. 2 is a plan view thereof. Fig. 3 is an enlarged detailed side view of the propelling, reversing, steering, and brake mechanism. Fig. 4 is a plan view of the same. Fig. 5 is a detailed front view of the propelling and reversing movement. Fig. 6 is an enlarged detailed sectional elevation of the same. Fig. 7 is an enlarged side view of the same. Fig. 8 is an enlarged detailed view of the guiding device; Fig. 9, a sectional elevation of the same; and Fig. 10 is a detailed enlarged view of the seat.

A represents the main wheel, and B B the two rear wheels, of the vehicle. The wheel A is secured upon the axle $a$, and the wheels B are journaled upon the axle $b$, which is centrally pivoted to a king-bolt, $b'$, held in the frame C, so that the axle $b$ may be turned for guiding the vehicle.

The frame C is composed of the side pieces, $c\ c$, and the rear cross-piece, $c'$, in which the king-bolt $b'$ is held. The forward ends of the side pieces, $c\ c$, are attached to the axle $a$ of the main wheel, as shown clearly in Fig. 1.

Upon the axle $a$ are secured two cog-wheels, $d$, one of which is shown in Fig. 3, the other in Fig. 4, and placed upon the axle $a$ are two segmental or quadrant frames or levers, D D', each provided with a double reversible pawl, $d'$, adapted to engage with the cog-wheels $d$, so that when the segments D D' are rotarily reciprocated by the rider operating alternately the pedals E E' the power will be transmitted to the axle $a$ and main wheel A and propel the vehicle. The pawls $d'$ may be reversed by the cords $d^2$, passing over guides $d^3$ and leading back to within reach of the rider.

The pedal E is attached to a cross pedal-rod, $e$, and the pedal E' to another cross-rod, $e'$. (See Fig. 2.) To one end of the pedal-rod $e$ is attached the cord $e^2$, to the other the cord $e^3$, and to the ends of the pedal-rod $e'$ are connected, respectively, the cords $e^4$ and $e^5$. The cord $e^2$ is attached to the lever or quadrant F, (see Figs. 2 and 4,) which is pivoted to the end of the short shaft F', journaled in the side piece, $c$, of the frame. The cord $e^4$ is attached to the quadrant-lever F², pivoted to the opposite inner end of the said short shaft F'. From the quadrant-levers F F² the cords $e^2\ e^4$ pass over the pulleys $f\ f$ down to their respective pedal-rods $e\ e'$, as shown clearly in Fig. 2.

The cord $e^3$ is attached to the quadrant-lever G, pivoted to the short shaft G', journaled in the side piece, $c$, on the opposite side of the machine, while the cord $e^5$ is attached to the quadrant-lever G², and from the levers G G² the said cords $e^3\ e^5$ pass over the pulleys $g\ g$ to their respective pedal-rods, as shown in Fig. 2. (See, also, Figs. 3 and 5.)

The side pieces, $c$, of the main frame are each provided with a side piece, $c'$, to form bearings for the short shafts F' G', and upon the shaft F' is secured the grooved wheel H, while on the shaft G' is secured the grooved wheel H'. A cord or belt, $i$, passes around the wheel H, thence over the pulley $i'$ at the front end of the side pieces of the frame, thence over the edge of the quadrant-lever D', to which it is attached, then under pulley $i^2$ and over pulley $i^3$. Over pulley H' passes a cord or belt, $j$, Fig. 1, which passes around pulley $j'$ at the front of the vehicle, thence over the edge of the quadrant-lever D, to which it is attached, then under pulley $j^2$ and over $j^3$. In this manner it will be seen that the alternate reciprocation of the pedals E E' will alternately rotarily reciprocate the short shafts F' G', which will rotarily reciprocate the wheels or pulleys H H', which will alternately reciprocate the quadrant-levers D D' and cause the pawls $d'$ $d'$, acting with the cog-wheels $d\ d$, to turn the main drive-wheel A, and thus drive the vehicle. Sockets can be attached on the sides of the quadrant-levers, to receive short levers, which can be grasped by the rider for operating the mechanism by hand, these levers to be otherwise carried when not in use.

The quadrant-levers F F² and G G² are adapted to be reversed, as indicated in full and dotted lines in Fig. 5, for reversing the motion of the vehicle, and they are adapted to be simultaneously reversed by the rider pulling one or the other of the cords $k$ $k'$. (Shown in Fig. 3.) The upper ends of the cords $k$ $k'$ are attached to the cords $d^2$ $d^2$, so that the act of reversing the quadrant-levers will at the same time reverse the pawls $d'$ $d'$. The cord $k$ passes under the pulley $l$, journaled at the outer end of the short shaft F', (see Fig. 6,) and is connected at its outer end to the spring locking-button $m$, which engages with the shoulder $m'$ of the shaft F' for locking the quadrant-lever F in elevated position, as shown in Fig. 6, so that a slight pull upon the cord $k$ will disengage the button $m$ from the short shaft, and at the same time swing the lever downward. Another cord, $k^2$, passes under the pulley $l'$, and is connected by another slack cord, $l^2$, to the spring-button $m^2$. This latter button is adapted to engage with the shoulder $m^3$ of the short shaft F' for locking the lever F in position opposite to that shown in Fig. 6. The slack cord $l^2$ is of proper length, so that when the cord $k$ is pulled on by means of the cord $d^2$ it will act first to disengage the button $m^2$ from the shoulder $m^3$, and then act to swing the quadrant-lever F to its elevated position shown in Figs. 6 and 7. The connection between these cords and their respective buttons is made through a wire link, $l^3$, one end of which is attached to the button, as shown in Fig. 6, so that the first pull of the cords will move the buttons.

The quadrant-lever F² is a duplicate of lever F, and is provided with spring-buttons exactly similar to the buttons $m$ $m^2$, and said buttons have connected to them cords arranged precisely similar to the cords $k$ $k^2$ $l^2$, so that by drawing upon the cord $k'$ (shown in Fig. 3) the said quadrant-lever F² will be raised and lowered, as required to reverse the direction of movement of the vehicle.

The quadrant-levers G and G² (see Fig. 5) are each provided upon opposite sides with spring-buttons $o$ $p$, for locking with the axle G', for securing the levers in position for operation, and these spring-buttons are operated simultaneously by drawing upon the cords $k$ $k'$ and branch cords $q$, and these cords, after operating the spring-buttons, also act to swing the levers upon their pivots, the same as the cords $k$ $k^2$ act to operate the spring-buttons $m$ $m^2$ and the quadrants F F², as above described. The cords $d^2$ $d^2$ pass through guides $d^3$ $d^3$, (shown clearly in Figs. 1, 3, and 9,) attached to the plate J, in which the winding post or drum J' is held, so that the said cords will be convenient to the reach of the rider on the pedals E E' or upon the seat L.

The plate J is held in uprights $s$ $s$ rising from the side pieces, $c$ $c$, of the main frame, and it is formed with a series of holes, $s'$. The drum J' passes through a central opening in the plate J, and the two ropes J² J² are attached to its lower end, while a circular plate, J³, is attached to its upper end for turning the drum. The ropes J² J² reach to the rear axle, $b$, near the wheels B B, so that by turning the drum J' the axle may be turned in either direction for guiding the vehicle. The plate J³, which in effect is a crank for turning the drum J', is provided with a spring-catch, $t$, adapted to enter any of the series of holes $s'$ for locking the drum J' at any desired position, and the spring-catch is provided with handle $t'$, by which the catch may be operated for releasing and locking the plate J³.

The seat L is hinged to the side pieces, $c$, of the main frame, so it may be easily turned out over $c$ on the right-hand side, to permit the rider, who has come in over the rear axle, to mount the pedals; and the seat is hung in journals, so it may be easily turned to support the rider as a seat, or to form a back brace, as when the vehicle is being propelled upgrade or at high speed.

N represents the brake-lever. (Shown clearly in Fig. 2.) This lever is pivoted to a cross-piece, $n$, (shown in Fig. 2,) and is divided at its upper end to form two diagonal arms, and on each arm is placed a roller, $n'$ $n'$, which, when the lower end of the lever is drawn outward, impinge upon the main drive-wheel A, and thus brake or retard the motion of the vehicle.

Having thus fully described my invention, I claim as new and desire to secure by Letters Patent—

1. In a foot-power vehicle, the two short shafts F' G', each provided at its ends with quadrants or levers, in combination with the reciprocating pedals E E' and the quadrants D D' on the main axle, the pedals and quadrants or levers being connected by cords, whereby the reciprocating motion of the pedals reciprocates the quadrants, substantially as described.

2. In a foot-power vehicle, the short shaft F', provided at its ends with pivoted levers or quadrants, substantially as described.

3. In a foot-power vehicle, the short shaft F', provided at its ends with pivoted quadrant-levers and in its center with a wheel, H, substantially as described.

4. In a foot-power vehicle, the short shaft F', provided at its ends with pivoted quadrant-levers, each provided with spring-buttons, substantially as and for the purposes set forth.

5. In a foot-power vehicle, the drum J', over which the guiding-cords J² J² pass, in combination with the plate J, having a series of holes, $s'$, and the plate or lever J³, provided with a spring-catch, $t$, substantially as and for the purposes set forth.

GEORGE W. RODECAP.

Witnesses:
CONRAD S. RODECAP,
MILTON HALL.